United States Patent [19]
Roeske

[11] Patent Number: 6,032,350
[45] Date of Patent: Mar. 7, 2000

[54] METHOD OF SLOTTED COMPONENT MANUFACTURE

[75] Inventor: Klaus Juergen Roeske, Lugarno, Australia

[73] Assignee: Bishop Steering Pty Limited, North Ryde, Australia

[21] Appl. No.: 09/101,182

[22] PCT Filed: Sep. 23, 1997

[86] PCT No.: PCT/AU97/00628

§ 371 Date: Jul. 2, 1998

§ 102(e) Date: Jul. 2, 1998

[87] PCT Pub. No.: WO98/13163

PCT Pub. Date: Apr. 2, 1998

[30] Foreign Application Priority Data

Sep. 24, 1996 [AU] Australia ................. PO2518

[51] Int. Cl.$^7$ .................................................. B23P 23/00
[52] U.S. Cl. ................... 29/558; 29/890.132; 409/244; 409/293
[58] Field of Search .............. 29/558, 890.132, 29/38 B, 47, 33 R; 409/244, 293

[56] References Cited

U.S. PATENT DOCUMENTS 5,390,408  2/1995  Bishop et al. ..................... 29/558
5,581,880  12/1996  Iio et al. ........................... 29/888.022

*Primary Examiner*—P. W. Echols
*Assistant Examiner*—John C. Hong
*Attorney, Agent, or Firm*—Nikaido, Marmelstein, Murray & Oram LLP

[57] ABSTRACT

This invention relates to a method for manufacturing a plurality of longitudinally extending slots in the bore of a component (1). One example of such a component is the sleeve element of an automotive power steering rotary valve. More particularly the invention is directed towards a method of minimising burring of the slot edges of the sleeve component. The method comprises the steps of gripping the component (1) in a gripping mechanism (2) of a workholding device, performing a first cutting operation (5) in which the slot is cut in the bore by a series of progressively deeper cutting stroke of a cutting tool (5), further machining (30) the bore of the component, the machining of the bore being carried out while the component remains gripped in the gripping mechanism, characterized in that while the component remains gripped in the gripping mechanism the slot undergoes a second cutting operation (5) similar to the first operation.

7 Claims, 3 Drawing Sheets

METHOD OF SLOTTED COMPONENT MANUFACTURE

TECHNICAL FIELD

This invention relates to a method for manufacturing a plurality of longitudinally extending slots in the bore of a component. One example of such a component is the sleeve element of an automotive power steering rotary valve. More particularly the invention is directed towards a method of minimising burring of the slot edges of the sleeve component.

BACKGROUND ART

The prior art most closely related to that of the present invention is that covered by U.S. Pat. No. 5,328,309 (Bishop et al), U.S. Pat. No. 5,292,214 (Bishop et al). These prior art references relate to "slotting machines" which machine the slots in the bore of power steering valve sleeves. The design of these machines calls for each of the slots to be scooped out of the bore of a turned blank by a finger-like cutting tool mounted on a cutting spindle which angularly reciprocates about an axis in a series of progressively deeper cutting and return strokes so forming slots in the form of (usually) closed chambers, which are arcuate or partially arcuate in longitudinal section. The sleeve is held in a work holding collet, in turn mounted in a work holding spindle, having a rotational axis perpendicular to and offset with respect to the cutting spindle axis. By accurately indexing the work holding spindle upon completion of each slot, the required number of slots are precisely machined in the sleeve, usually 4, 6, 8, 10 or 12 slots for most automotive applications.

A problem associated with slotting is a tendency for bore material to burr at the edges of each slot being machined. Once an array of slots have been machined in the bore of a sleeve, a bore finishing operation can be performed by use of a boring tool. Such a method is disclosed in U.S. Pat. No. 5,390,408 (Bishop et al). However in this operation, the boring tool has been found to push the burrs on the slot edges in the direction of rotation, resulting in burr material overhanging each slot from one of its edges. On a typical slot width of say 4.5 mm, the burr overhang size may for instance be in the order of 30–70 $\mu$m.

A problem with slot edge burrs is that they affect the "boost control" and increase the noise generated during operation of the power steering valve. It has been found that the aforesaid limitations on slot machining of sleeves have imposed limitations on design of steering gear valves, and an object of the invention is to alleviate the situation by minimising the resultant burr on the sleeve edges.

SUMMARY OF INVENTION

In a first broad aspect the present invention is a method for machining at least one longitudinal extending slot in a bore of a component, comprising the steps of gripping said component in a gripping means of a workholding device, performing a first cutting operation in which said slot is cut in said bore by a series of progressively deeper cutting strokes of a cutting tool, further machining said bore of said component, said machining of said bore being carried out whilst the component remains gripped in said gripping means, characterized in that whilst said component remains gripped in said gripping means said slot undergoes a second cutting operation similar to the first cutting operation.

In a second broad aspect the present invention is a method for machining an angularly disposed array of parallel longitudinally extending slots in a bore of a component, comprising the steps of gripping said component in a gripping means of a workholding device mounted on an indexable workholding spindle, performing a first cutting operation in which said array of slots are cut in said bore by a series of progressively deeper cutting strokes of a first cutting tool, the cutting of each slot being followed by indexation of said work holding spindle, further machining said bore of said component, said machining of said bore being carried out whilst the component remains gripped in said gripping means, characterized in that whilst said component remains gripped in said gripping means the slots undergo a second cutting operation similar to the first cutting operation.

Preferably during said machining of said bore and said second cutting operation the component remains gripped in the same location and orientation as during said first cutting operation.

Subsequent to said machining of said bore and whilst said component remains gripped in said gripping means, said work holding spindle is preferably indexed by a small amount clockwise or anti-clockwise prior to said cutting operation.

Preferably in a first embodiment the first cutting tool is used for the second cutting operation.

Preferably in a second embodiment the second cutting operation utilises a second cutting tool larger in width than said first cutting tool. Preferably both the first and second cutting tools are mounted on the same tool head.

BRIEF DESCRIPTION OF THE DRAWINGS

The present invention will now be described by way of example with reference to the accompanying drawings in which.

MODE OF CARRYING OUT INVENTION

Figure 1:
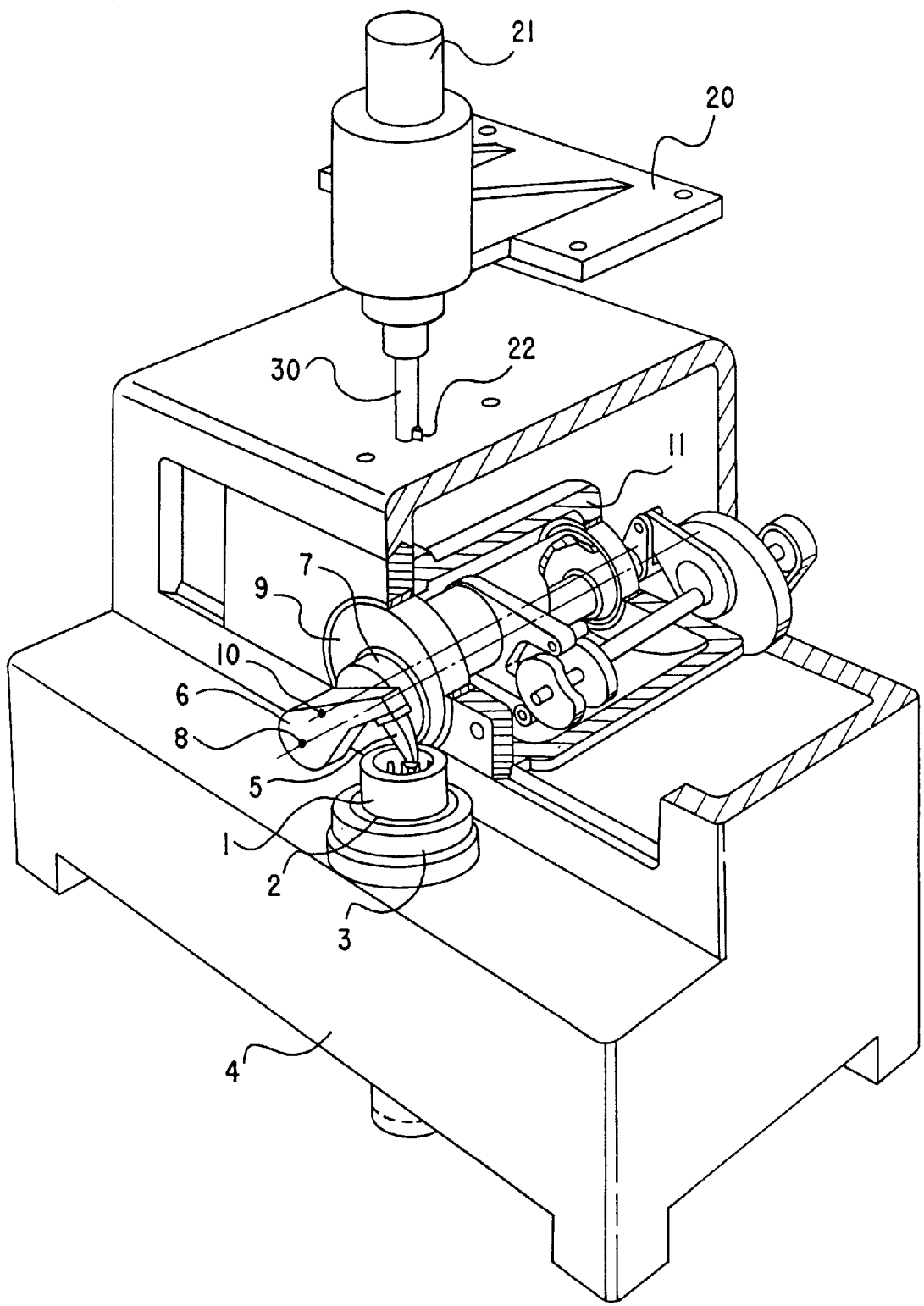
FIG. 1 is a sectioned perspective view of a slotting machine in accordance with a first embodiment of the present invention.

FIG. 1 shows a slotting machine which holds sleeve 1 in collet 2 of work holding spindle 3 which is mounted for both rotation and axial sliding in machine base 4. Cutting tool 5 is secured to an arm 6 extending from cutting spindle 7. Cutting spindle 7 oscillates angularly through an angle of approximately 45 degrees and cutting tool 5 is shown in its uppermost position. Cutting spindle 7 is journalled for rotation about an axis 8 within spindle carrier 9 which is itself journalled about an axis 10 in cutting capsule 11. The typical angular oscillation of spindle carrier 9 is approximately 8 degrees.

The cam drive arrangement for imparting reciprocating motion to cutting tool 5 which is housed within cutting capsule 11, is not described herein as it is fully covered in U.S. Pat. No. 5,292,214 (Bishop et al). The infeed mechanism may be of a mechanical cam driven type as described in the above referenced prior art or of a suitable numerically controlled servo-rive mechanism, adapted to impart relative linear horizontal motion between the cutting capsule 11 and the sleeve, thereby providing a means for infeeding cutting tool 5 during a cutting operation.

The work holding spindle is also adapted for axial (vertical) linear movement which may in operation be similar to that described in the above referenced prior art U.S. Pat. No. 5,328,309 (Bishop et al), or alternatively by a suitable numerically controlled servo-drive means. This allows for the sleeve to axially clear the cutting tool.

However, in another not shown embodiment the relative vertical linear movement between the work holding spindle and the cutting tool may be achieved by providing a vertically movable cutting capsule.

The slotting machine incorporates a boring assembly 20, the operation of which is similar in operation to the boring assembly described in U.S. Pat. No. 5,390,408 (Bishop et al.) and is more fully described therein. Boring assembly 20 includes a sliding quill 21 whose axis is machined precisely in line with the bearings supporting work holding spindle 3 in machine base 4. Quill 21 incorporates rotatable boring bar 30 on which boring tool 22 is mounted. With cutting tool 5 moved out of the way, it is possible to perform a boring operation on sleeve 1, in which the work holding spindle 3 is held stationary and rotating boring tool 22 is inserted into the bore of sleeve 1. Alternatively, boring bar 30 may be non-rotating with work holding spindle 3 rotated by a motor (not-shown) to achieve the boring operation.

Figure 2:
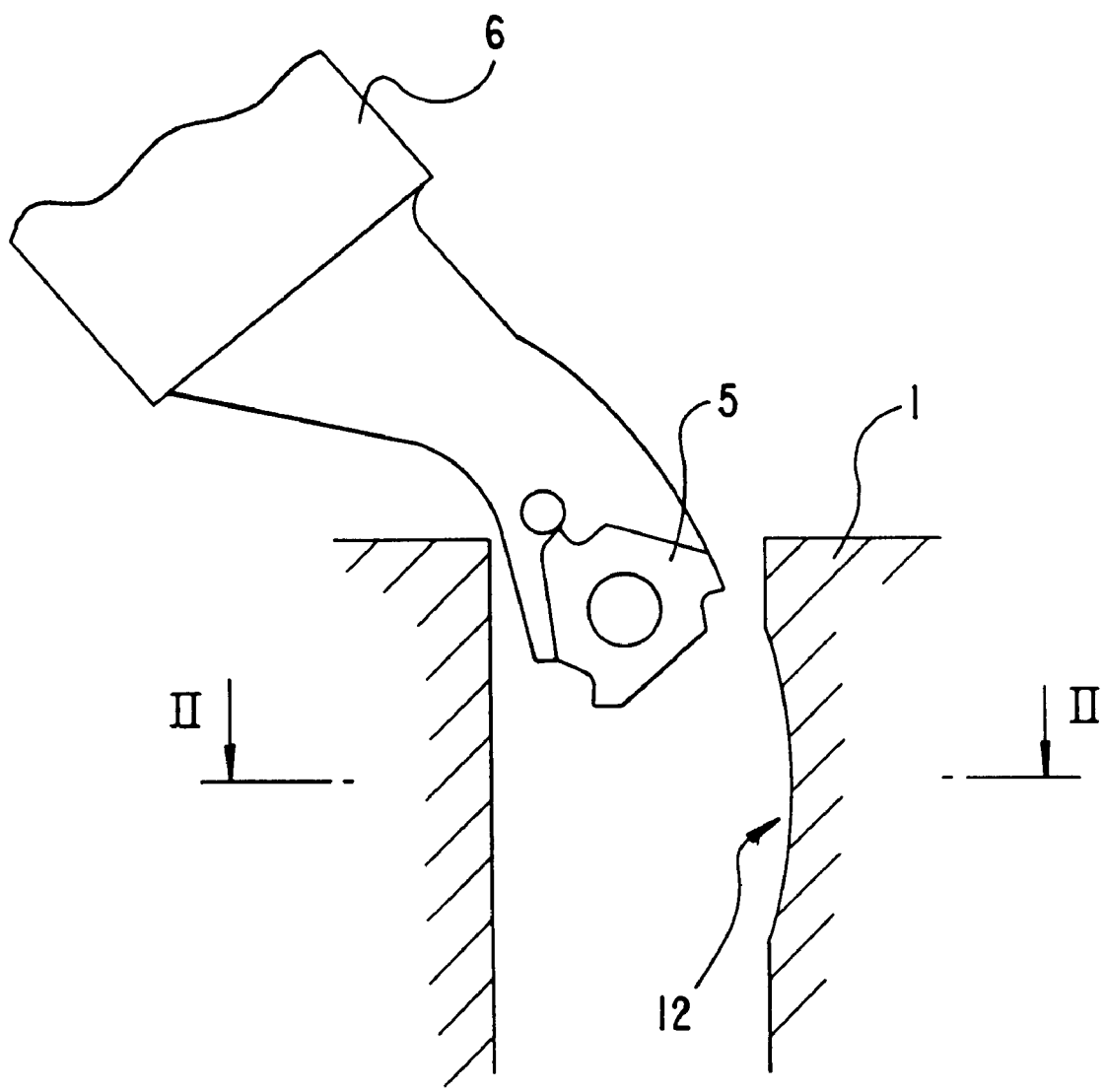
FIG. 2 is a partial vertical cross section of a sleeve with a blind-ended slot in relation to the cutting tool of the machine shown in FIG. 1.

FIG. 2 shows sleeve 1 in its relation to cutting tool 5 when cutting a blind-ended arcuate slot 12. For ease of description this embodiment will describe slotting an array of slots where each slot is similar to slot 12. However, it should be understood that the method of the present invention, could be utilised with slots of varied configuration such as those disclosed in Australian Provisional Patent Application No.PN6288 filed Oct. 31, 1995, entitled "Component and method of manufacture thereof" and Australian Provisional Patent Application No.PO0647 filed Jun. 26, 1996, entitled "Slotted component and method of manufacture thereof".

In a first cutting operation an array of blind ended slots 12 are cut into the bore of sleeve 1, with cutting tool 5 scooping out each slot in a series of progressively deeper cutting and strokes. The work holding spindle 3, and therefore gripped sleeve 1, are accurately indexed prior to the cutting of each slot. Once all slots are cut, boring assembly 20 is used to perform a boring operation, whilst sleeve 1 remains gripped in collet 2 of work holding spindle 3 in the same location and orientation as during the first cutting operation. Following completion of the boring operation, cutting tool 5 is used to perform a second cutting operation, also whilst sleeve 1 remains gripped in collet 2 of work holding spindle 3 in the same location and orientation as during the first cutting operation. This second cutting operation reduces the amount of burring present on the side edges of slots by removing burr overhang which occurs as a result of the first cutting operation and the subsequent boring operation.

Figure 3A:
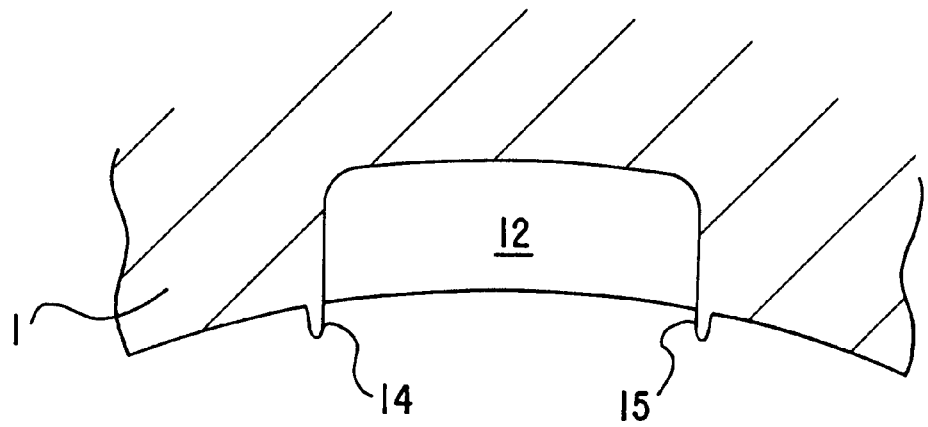
FIGS. 3(a), 3(b) and 3(c) show cross sectional views of slot on a sleeve through line II—II, after a first cutting operation, boring operation and second cutting operation, respectively.

FIG. 3(a) depicts slot 12 on sleeve 1 in cross-section, after the first cutting operation. As a result of the first cutting operation, burrs have formed at edges 14, 15 of slot 12, which extend radially into the bore of the sleeve.

Figure 3B:
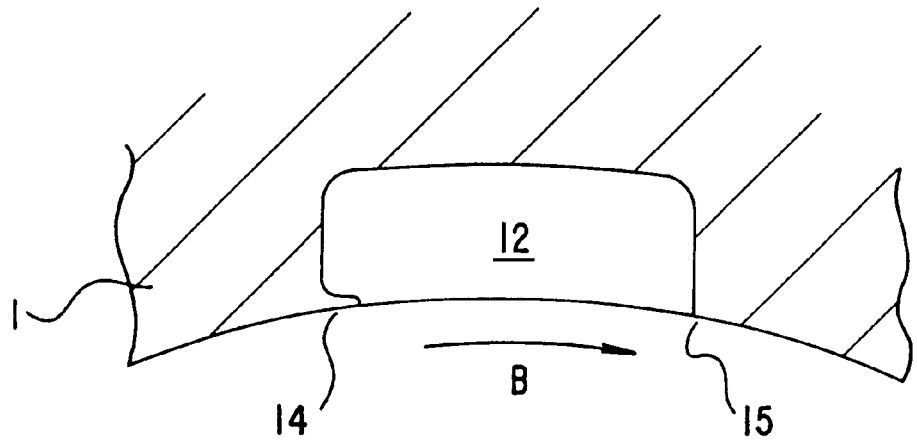

FIG. 3(b) depicts slot 12 on sleeve 1 in cross-section, after the boring operation. As a result of the boring operation, where boring bar 30 is rotated in direction of arrow B, or alternatively where boring bar 30 is non-rotatable and work holding spindle is rotated in the opposite direction to arrow B, the burr at edge 14 has been deflected circumferentially and now overhangs slot 12, whilst the burr at edge 15 has substantially been removed.

Figure 3C:
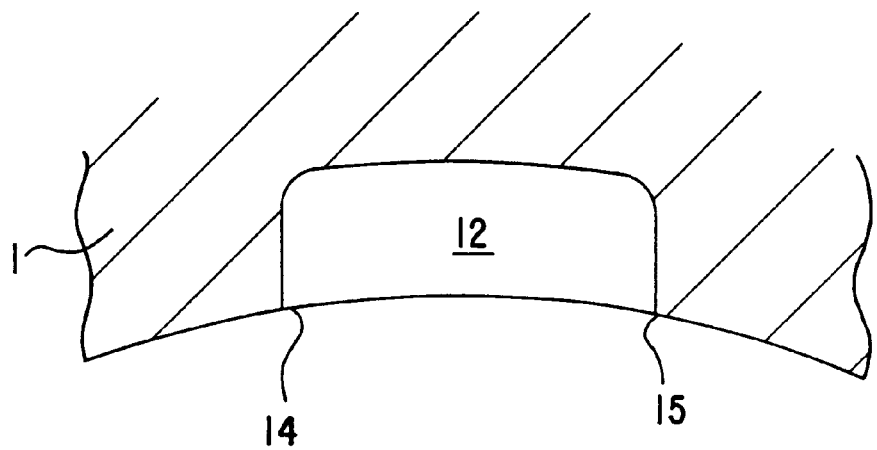

FIG. 3(c) depicts slot 12 on sleeve 1 in cross-section, after the second cutting operation. As a result of the second cutting operation, the remaining burr at edge 14 has been substantially removed.

An additional step of indexing the workholding spindle a small amount either clockwise and/or anti-clockwise whilst the sleeve remains gripped, may be performed after completion of the boring operation and prior to the second cutting operation. The small amount of indexing may for Instance be of the order of 0.05 degrees and allows cutting tool 5 to skim the side of the slot during the second cutting operation.

In an alternative embodiment, the second cutting operation may for instance be achieved by using a cutting tool of slightly larger width than the cutting tool used for the first cutting operation. In order to perform such cutting operation a machine having two or more independent cutting tools may be used. One such cutting arrangement using a two cutting tools mounted to a common tool head, is shown in the earlier mentioned Australian Provisional Patent Application No.PO0647, the disclosure of which is incorporated herein by reference.

By performing a second cutting operation after boring the slotted sleeve element in the above described manner, it has been found that the resultant reduction in burring of the slot edges improves the "boost control" characteristics and reduces the "hiss" noise generated during operation of the assembled power steering valve.

It will be recognised by persons skilled in the art that numerous variations and modifications may be made to the invention without departing from the spirit and scope of the invention.

What is claimed is:

1. A method for machining at least one longitudinal extending slot in a bore of a component and minimizing burrs on edges of the slot, comprising the steps of gripping said component in a gripping means of a workholding device, performing a first cutting operation in which said slot is cut in said bore by a series of progressively deeper first cutting strokes of a cutting tool, further machining said bore of said component, said further machining of said bore being carried out whilst the component remains gripped in said gripping means, and, thereafter whilst said component remains gripped in said gripping means performing on said slot a second cutting operation similar to the first cutting operation using second cutting strokes.

2. A method for machining an angularly disposed array of parallel longitudinally extending slots in a bore of a component and minimizing burrs on edges of the slot, comprising the steps of gripping said component in a gripping means of a workholding device mounted on an indexable workholding spindle, performing a first cutting operation in which said array of slots are cut in said bore by a series of progressively deeper cutting strokes of a first cutting tool, the cutting of each slot being followed by indexation of said work holding spindle, further machining said bore of said component, said further machining of said bore being carried out whilst the component remains gripped in said gripping means, and, thereafter whilst said component remains gripped in said gripping means, performing on the slots a second cutting operation similar to the first cutting operation using second cutting strokes.

3. A method as claimed in claim 2 wherein during said further machining of said bore and said second cutting operation the component remains gripped in the same location and orientation as during said first cutting operation.

4. A method as claimed in claim 3 wherein subsequent to said further machining of said bore and whilst said component remains gripped in said gripping means, said work holding spindle is preferably indexed by a small amount clockwise or anti-clockwise prior to said second cutting operation.

5. A method as claimed in claim 3 wherein the first cutting tool is used for the second cutting operation.

6. A method as claimed in claim 3 wherein the second cutting operation utilises a second cutting tool larger in width than said first cutting tool.

7. A method as claimed in claim 6 wherein the first and second cutting tools are both mounted on the same tool head.

* * * * *